(12) United States Patent
Li (10) Patent No.: US 10,192,064 B2
(45) Date of Patent: Jan. 29, 2019

(54) METHOD OF SECURITY ACCESS CONTROL FOR HARD DISK AND HARD DISK

(71) Applicant: Huawei Technologies Co., Ltd., Shenzhen (CN)

(72) Inventor: Yibin Li, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 168 days.

(21) Appl. No.: 15/270,734

(22) Filed: Sep. 20, 2016

(65) Prior Publication Data

US 2017/0011222 A1 Jan. 12, 2017

Related U.S. Application Data

(63) Continuation of application No. PCT/CN2015/079945, filed on May 27, 2015.

(30) Foreign Application Priority Data

Jun. 23, 2014 (CN) .......................... 2014 1 0284498

(51) Int. Cl.
*G06F 21/00* (2013.01)
*G06F 21/60* (2013.01)
(Continued)

(52) U.S. Cl.
CPC ............ *G06F 21/604* (2013.01); *G06F 12/14* (2013.01); *G06F 12/1458* (2013.01);
(Continued)

(58) Field of Classification Search
CPC ......... G06F 21/604; G06F 21/31; G06F 12/14
(Continued)

(56) References Cited

U.S. PATENT DOCUMENTS

2006/0136663 A1 6/2006 Cochran et al.
2007/0143555 A1 6/2007 Nemiroff et al.
(Continued)

FOREIGN PATENT DOCUMENTS

CN 1480849 A 3/2004
CN 1595517 A 3/2005
(Continued)

OTHER PUBLICATIONS

Foreign Communication From a Counterpart Application, Chinese Application No. 201410284498.9, Chinese Office Action dated Feb. 13, 2017, 8 pages.
(Continued)

*Primary Examiner* — Anthony D Brown
(74) *Attorney, Agent, or Firm* — Conley Rose, P.C.

(57) ABSTRACT

A method of security access control for a hard disk and a hard disk, where the hard disk includes an Internet Protocol (IP) interface and a control board, and the method includes that the IP interface receives an access data packet and sends the access data packet to the control board, where the control board parses the access data packet to obtain an authentication data packet, where the authentication data packet includes access permission information, inspects the access permission information according to a stored security policy to determine whether an access is authorized, performs a security check on the access data packet using a security algorithm when the access of the user is authorized, and allows accessing data in a corresponding sector on the hard disk according to the sector identifier when the security check is passed.

17 Claims, 3 Drawing Sheets

(51) Int. Cl.
  *G06F 12/14* (2006.01)
  *G06F 21/31* (2013.01)
  *G06F 21/62* (2013.01)
  *G06F 21/78* (2013.01)

(52) U.S. Cl.
  CPC .......... *G06F 21/31* (2013.01); *G06F 21/6218* (2013.01); *G06F 21/6227* (2013.01); *G06F 21/78* (2013.01); *G06F 2212/1052* (2013.01)

(58) Field of Classification Search
  USPC .......................................................... 726/1
  See application file for complete search history.

(56) References Cited

U.S. PATENT DOCUMENTS

| | | | |
|---|---|---|---|
| 2008/0052709 | A1 | 2/2008 | Tang |
| 2009/0300710 | A1 | 12/2009 | Chai et al. |
| 2010/0017575 | A1 | 1/2010 | Kim |
| 2015/0341785 | A1* | 11/2015 | Young ................... H04W 12/04 607/60 |

FOREIGN PATENT DOCUMENTS

| | | |
|---|---|---|
| CN | 1707440 A | 12/2005 |
| CN | 1795439 A | 6/2006 |
| CN | 101030175 A | 9/2007 |
| CN | 101441604 A | 5/2009 |
| CN | 102571434 A | 7/2012 |
| CN | 103297441 A | 9/2013 |
| CN | 103778075 A | 5/2014 |
| CN | 104063641 A | 9/2014 |
| GB | 2479227 B | 12/2015 |

OTHER PUBLICATIONS

Foreign Communication From a Counterpart Application, European Application No. 15812145.9, Extended European Search Report dated Mar. 28, 2017, 7 pages.
Partial English Translation and Abstract of Chinese Patent Application No. CN104063641, Sep. 24, 2014, 3 pages.
Partial English Translation and Abstract of Chinese Patent Application No. CN1480849, Mar. 10, 2004, 6 pages.
Partial English Translation and Abstract of Chinese Patent Application No. CN102571434, Jul. 11, 2012, 9 pages.
Partial English Translation and Abstract of Chinese Patent Application No. CN103297441, Sep. 11, 2013, 11 pages.
Foreign Communication From a Counterpart Application, Chinese Application No. 201410284498.9, Chinese Office Action dated Jul. 1, 2016, 7 pages.
Foreign Communication From a Counterpart Application, PCT Application No. PCT/CN2015/079945, English Translation of International Search Report dated Aug. 3, 2015, 2 pages.
Foreign Communication From a Counterpart Application, PCT Application No. PCT/CN2015/079945, English Translation of Written Opinion dated Aug. 3, 2015, 6 pages.

* cited by examiner

METHOD OF SECURITY ACCESS CONTROL FOR HARD DISK AND HARD DISK

CROSS-REFERENCE TO RELATED APPLICATIONS

This application is a continuation in of International Application No. PCT/CN2015/079945, filed on May 27, 2015, which claims priority to Chinese Patent Application No. 201410284498.9, filed on Jun. 23, 2014, both of which are hereby incorporated by reference in its entireties.

TECHNICAL FIELD

Embodiments of the present disclosure relate to the field of computer technologies, and in particular, to a method of security access control for a hard disk and a hard disk.

BACKGROUND

An existing hard-disk data access control technology is based on an upper-layer application and an upper-layer device. For example, in a storage device, an ordinary block storage device integrates disks into a redundant array of independent disks (RAID) group, where the RAID is divided into stripes, and a stripe is divided into logic units (LUN), which then mapped onto an upper-layer host. A host layer manages stored data using a file system or another device system (for example, using a database of the device). Alternatively, a hard disk is directly installed into a simple computer system, and an operating system manages, using a file system, a storage manner and an access manner for data on the hard disk.

An existing distributed key-value storage system is an object-based storage system. In this storage system, all data is divided into small objects, which are then stored, based on a hash algorithm, in several locations in a distributed hash table (DHT) ring. In this way, a user can retrieve data corresponding to an object using a key, thereby implementing an access to the data. This storage system can implement simultaneous accesses of multiple users to the same storage system. A logical layer is implemented in the system at a user access interface to implement isolation of data accesses of the multiple users and protect data security, where the logical layer can enable different users to access and to only access a range of data allocated to themselves, but not to access data of other users.

An implementation principle of a prior-art key-value storage device is actually logical isolation. Logical design is subject to insecurity. To implement management of accesses of all users using a user management layer in a system, it needs to be ensured that an access interface for the users is unique and secure and that an access of a user to related data can be obtained only after the access is authenticated by the interface. Data of all users can still be accessed if the access interface of the system is not unique, or any data can be accessed after the system has a related vulnerability.

SUMMARY

Embodiments of the present disclosure provide a method of security access control for a hard disk and a hard disk, to resolve a prior-art security problem in a hard disk access.

According to a first aspect, an embodiment of the present disclosure provides a method of security access control for a hard disk, where the hard disk includes an Internet Protocol (IP) interface and a control board, and the method includes receiving, by the IP interface, an access data packet of a user, and sending the access data packet to the control board, parsing, by the control board, the access data packet to obtain an authentication data packet, where the authentication data packet includes access permission information of the user, inspecting the access permission information of the user according to a stored security policy to determine whether an access of the user is authorized, where the security policy records a correspondence between access permission information of users and sector identifiers of sectors on the hard disk, performing a security check on the access data packet using a security algorithm if the access of the user is authorized, and allowing, according to the sector identifier, the user to access data in a corresponding sector on the hard disk if the security check is passed.

With reference to the first aspect, in a first implementation manner of the first aspect, inspecting the access permission information of the user according to a stored security policy to determine whether an access of the user is authorized includes performing matching between the access permission information of the user and the access permission information of the users in the correspondence, and the access of the user is authorized if the matching is successful, or the access of the user is unauthorized if the matching is unsuccessful.

With reference to the first aspect or the first implementation manner of the first aspect, in a second implementation manner of the first aspect, the method further includes pre-establishing a computing policy corresponding to the user in the control board, where the computing policy is a policy of using a security algorithm when a security check is performed on an access data packet of the user.

With reference to the second implementation manner of the first aspect, in a third implementation manner of the first aspect, performing a security check on the access data packet of the user using a security algorithm includes performing a security check on the access data packet by selecting a different security algorithm or a combination of different security algorithms according to the computing policy for each access of the user.

With reference to the first aspect or any one of the first to the third implementation manners of the first aspect, in a fourth implementation manner of the first aspect, when multiple hard disks provide data for a same user, the hard disks perform security checks on the access data packet of the user using a same security algorithm, or the hard disks perform security checks on the access data packet of the user using different security algorithms.

According to a second aspect, an embodiment of the present disclosure provides a hard disk, including an IP interface and a control board, where the IP interface is configured to receive an access data packet of a user, and send the access data packet to the control board, and the control board includes a parsing module configured to parse the access data packet to obtain an authentication data packet, where the authentication data packet includes access permission information of the user, an inspection module configured to inspect the access permission information of the user according to a stored security policy to determine whether an access of the user is authorized, where the security policy records a correspondence between access permission information of users and sector identifiers of sectors on the hard disk, a security check module configured to perform a security check on the access data packet using a security algorithm if the access of the user is authorized, and an access execution module configured to allow, according to the sector identifier, the user to access data in a corresponding sector on the hard disk if the security check is passed.

With reference to the second aspect, in a first implementation manner of the second aspect, the inspection module is further configured to perform matching between the access permission information of the user and the access permission information of the users in the correspondence, and the access of the user is authorized if the matching is successful, or the access of the user is unauthorized if the matching is unsuccessful.

With reference to the second aspect or the first implementation manner of the second aspect, in a second implementation manner of the second aspect, the control board further includes a security policy establishment module configured to pre-establish a computing policy corresponding to the user in the control board, where the computing policy is a policy of using a security algorithm when a security check is performed on an access data packet of the user.

With reference to the second implementation manner of the second aspect, in a third implementation manner of the second aspect, the security check module is further configured to perform a security check on the access data packet by selecting a different security algorithm or a combination of different security algorithms according to the computing policy for each access of the user.

According to the method of security access control for a hard disk and the hard disk in the embodiments of the present disclosure, the hard disk includes an IP interface and a control board. The IP interface receives an access data packet of a user and sends the access data packet to the control board. The control board parses the access data packet to obtain an authentication data packet, where the authentication data packet includes access permission information of the user, inspects the access permission information of the user according to a stored security policy to determine whether an access of the user is authorized, where the security policy records a correspondence between access permission information of users and sector identifiers of sectors on the hard disk, performs a security check on the access data packet using a security algorithm if the access of the user is authorized, and allows, according to the sector identifier, the user to access data in a corresponding sector on the hard disk if the security check is passed. This implements security control over an access of a user to a hard disk, improves access security, and resolves a prior-art security problem in a hard disk access.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
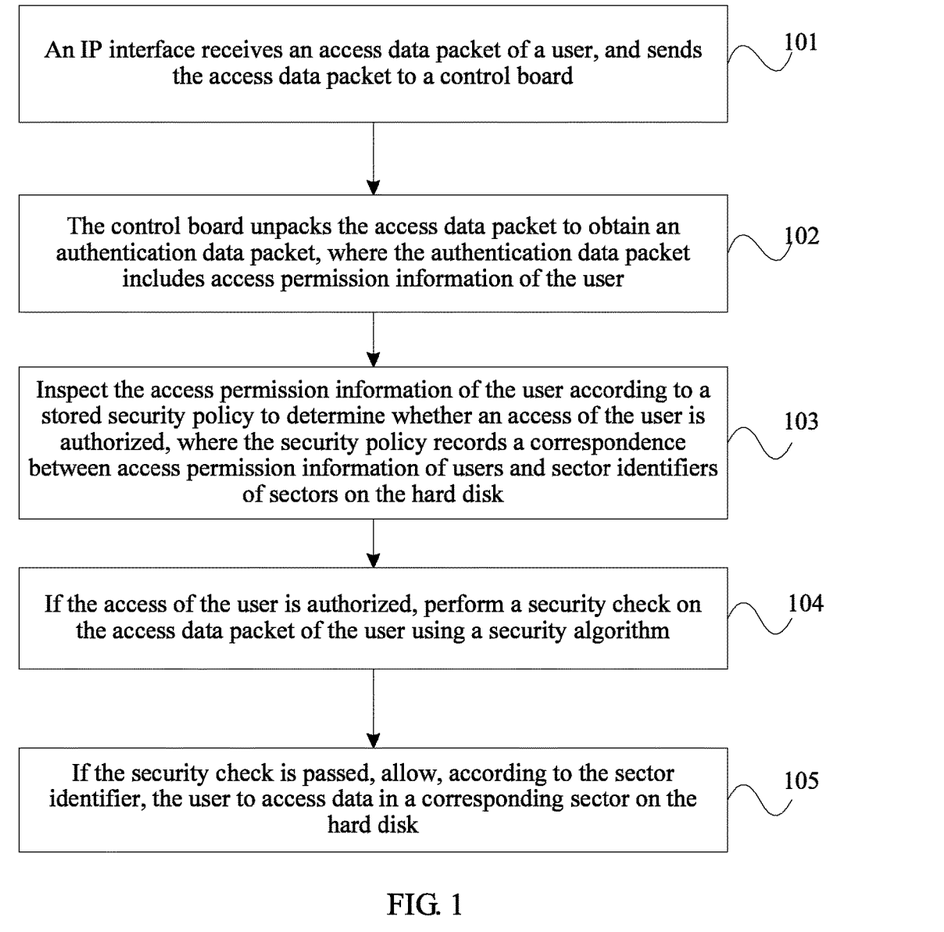
FIG. 1 is a flowchart of Embodiment 1 of a method of security access control for a hard disk according to the present disclosure.
Figure 2:
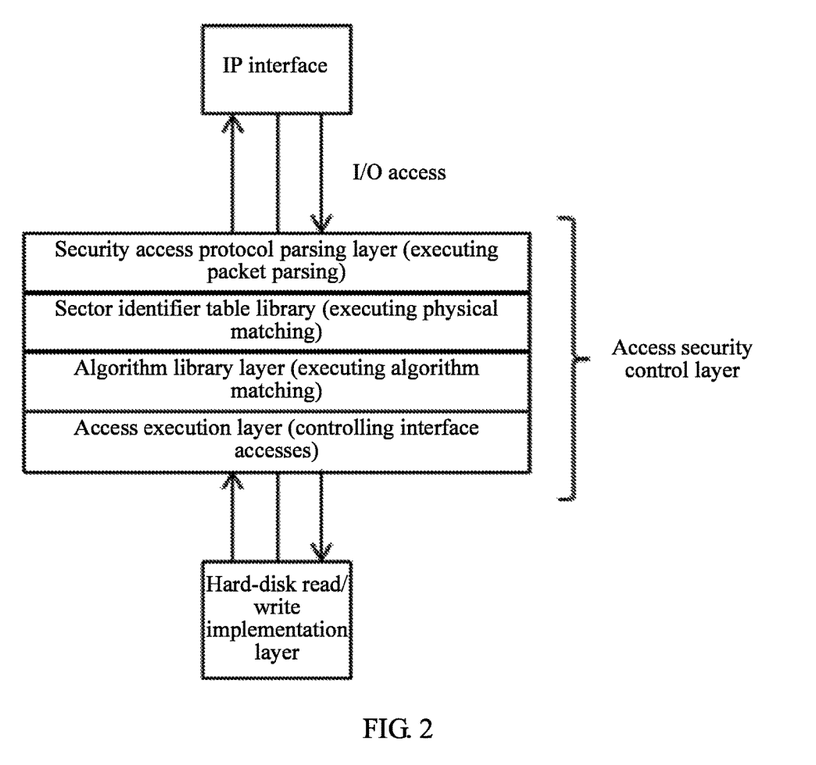
FIG. 2 is a schematic diagram of a logical architecture of a security access control layer of Embodiment 1 of the method of security access control for a hard disk according to the present disclosure.

FIG. 1 is a flowchart of Embodiment 1 of a method of security access control for a hard disk according to the present disclosure, and FIG. 2 is a schematic diagram of a logical architecture of a security access control layer of Embodiment 1 of the method of security access control for a hard disk according to the present disclosure. This embodiment is executed by a smart hard disk, for example, an IP-interface-based hard disk. The hard disk may be implemented using software and hardware. As shown in FIG. 1, the hard disk includes an IP interface and a control board. The method of this embodiment may include the following steps.

Step 101: The IP interface receives an access data packet of a user, and sends the access data packet to the control board.

Step 102: The control board unpacks the access data packet to obtain an authentication data packet, where the authentication data packet includes access permission information of the user.

Further, for example, on an IP-interface-based hard disk, the hard disk implements an access to external data using the IP interface. Therefore, the IP interface of the hard disk functions as a linkage similar to a computer network node. The hard disk itself also has a given computing capability. In the present disclosure, a security chip is disposed on the control board of the hard disk, where the security chip implements encryption and permission verification for each sector (different sectors may correspond to different users) of the hard disk. Authentication on all accesses to the hard disk is implemented based on computing and storage capabilities of the chip on the control board, and no unauthorized access is executed.

For all existing control over an access to data on a hard disk, the control is performed at a logical layer, which is an upper layer. If authentication succeeds, all read/write commands delivered by the upper layer to the hard disk are executed without any restriction. However, security access control for a hard disk in the present disclosure is implemented on the hard disk. As shown in FIG. 2, a security access control layer is used to perform authentication on an access of a user. The access can be executed if the access can be authenticated, and the access to the hard disk is denied if the authentication fails.

On the control board of the hard disk, a computing chip and a storage chip are used to implement "the security access control layer", where the computing chip, the storage chip, and the security chip may be implemented using a same chip, or may be implemented using several different chips. As shown in FIG. 2, the security access control layer is on an input/output (I/O) processing path of the hard disk and is determined by four main layers: a security access protocol parsing layer, a sector identifier table library layer, an algorithm library layer, and an access execution layer. After the access execution layer, a hard-disk read/write implementation layer is further included, where an existing hard-disk read/write implementation manner may be used at this layer. Step 102 may be implemented at the security access protocol parsing layer, to parse the access data packet of the user to obtain the authentication data packet that includes the access permission information of the user from the access data packet, for use by a lower layer.

Step 103: Inspect the access permission information of the user according to a stored security policy to determine whether an access of the user is authorized, where the security policy records a correspondence between access permission information of users and sector identifiers of sectors on the hard disk.

Furthermore, the step 103 may be implemented at the sector identifier table library layer. The access permission information includes, for example, a sector identifier of a sector accessible by the user and a security algorithm used by the user. The security policy records the correspondence between access permission information of users and sector identifiers of sectors on the hard disk, where the correspondence is, for example, that access permission of user 1 corresponds to sector identifier 1, and access permission of user 2 corresponds to sector identifier 2. Therefore, it may be determined, by means of inspection according to the correspondence in the security policy, whether the access of the user is authorized. If a sector identifier in the access permission information is consistent with a sector identifier in the correspondence between access permission information and sector identifiers, the access of the user is considered authorized, or otherwise, considered unauthorized.

Step 104: If the access of the user is authorized, perform a security check on the access data packet of the user using a security algorithm.

Further, the step 104 may be implemented at the algorithm library layer. If it is determined by means of inspection that the access of the user is authorized, a security check is performed on the access data packet of the user using the security algorithm, where the check may be performed using a prior-art check manner. The algorithm library layer stores the security algorithm used for performing a security check on the access of the user.

Step 105: If the security check is passed, allow, according to the sector identifier, the user to access data in a corresponding sector on the hard disk.

Furthermore, the step 105 may be implemented at the access execution layer. If the security check is passed, the user is allowed to access the data in the corresponding sector on the hard disk.

In this embodiment of the present disclosure, real security isolation of end user data stored on the hard disk is implemented.

The present disclosure is totally end user-based instead of being oriented toward any device or logical layer using the hard disk, and is device-independent and logic-independent. Such an architecture is simple in structure and easy to implement.

The hard disk in this embodiment includes a solid-state hard disk and another storage device, or a conventional hard disk to which an IP interface and a security chip are added.

In this embodiment, a hard disk includes an IP interface and a control board. The IP interface receives an access data packet of a user, and sends the access data packet to the control board. The control board parses the access data packet to obtain an authentication data packet, where the authentication data packet includes access permission information of the user, inspects the access permission information of the user according to a stored security policy to determine whether an access of the user is authorized, where the security policy records a correspondence between access permission information of users and sector identifiers of sectors on the hard disk, performs a security check on the access data packet using a security algorithm if the access of the user is authorized, and allows, according to the sector identifier, the user to access data in a corresponding sector on the hard disk if the security check is passed. This implements security control over an access of a user to a hard disk, improves access security, and resolves a prior-art security problem in a hard disk access.

In Embodiment 2 of the method of security access control for a hard disk of the present disclosure, on the basis of Embodiment 1 of the method, inspecting the access permission information of the user according to a stored security policy to determine whether an access of the user is authorized includes performing matching between the access permission information of the user and the access permission information of the users in the correspondence, and the access of the user is authorized if the matching is successful, or the access of the user is unauthorized if the matching is unsuccessful.

Further, identification for all sectors on the hard disk may be implemented at the sector identifier table library layer. A correspondence between different sector identifiers and access permission of users is set. For example, access permission of user 1 corresponds to sector identifier 1, and access permission of user 2 corresponds to sector identifier 2. Matching is performed between the access permission information of the user and the access permission information of the users corresponding to the sector identifiers of the sectors on the hard disk. By means of matching, isolation of accesses of different users can be implemented.

Optionally, the method further includes pre-establishing a computing policy corresponding to the user in the control board, where the computing policy is a policy of using a security algorithm when a security check is performed on an access data packet of the user.

Optionally, performing a security check on the access data packet of the user using a security algorithm includes performing a security check on the access data packet by selecting a different security algorithm or a combination of different security algorithms according to the computing policy for each access of the user.

Furthermore, at the algorithm library layer, a computing policy corresponding to the user may be established. Policy-based management may be implemented on multiple stored security algorithms, and it may be specified that different sectors are managed different algorithms. In a disk-based multi-user system, each user may select a particular algorithm to manage a corresponding data area of the user, for some particular areas, multiple checks may be performed using multiple different algorithms so as to increase security.

For each access of the user, a security check may be performed on the access data packet by selecting a different security algorithm or a combination of different security algorithms according to the computing policy. That is, a security algorithm used for each access of the user may be "one-time", or may be "multi-time". "One-time" means that the security algorithm used is valid for only once, that is, a different security algorithm is used for each access. "Multi-time" means that a same security algorithm is used for multiple accesses. "One-time" can implement a relatively high degree of security.

Optionally, when multiple hard disks provide data for a same user, the hard disks perform security checks on the access data packet of the user using a same security algorithm, or the hard disks perform security checks on the access data packet of the user using different security algorithms.

Furthermore, when multiple hard disks provide data for a same user, the multiple hard disks may provide only some sectors in a hard-disk storage capacity to form private storage space for the user. In this case, control over accesses to data on the hard disks may be implemented using a same security algorithm or may be implemented using different security algorithms. This may be implemented using a security policy at the algorithm library layer.

According to this embodiment, isolation and security can be implemented at a minimum granularity of a sector accessed by a magnetic head of a hard disk. That is, logically, a maximum quantity of users supported can reach up to a quantity of all normally accessible sectors on the hard disk (where one user corresponds to one sector). Multiple hard disks may use equivalent encryption such that that a same security algorithm is used for a same user, or use non-equivalent encryption so that different algorithms are used for a same user. This ultimately implements security control over an access of a user to a hard disk, improves access security, and resolves a prior-art security problem in a hard disk access.

Figure 3:
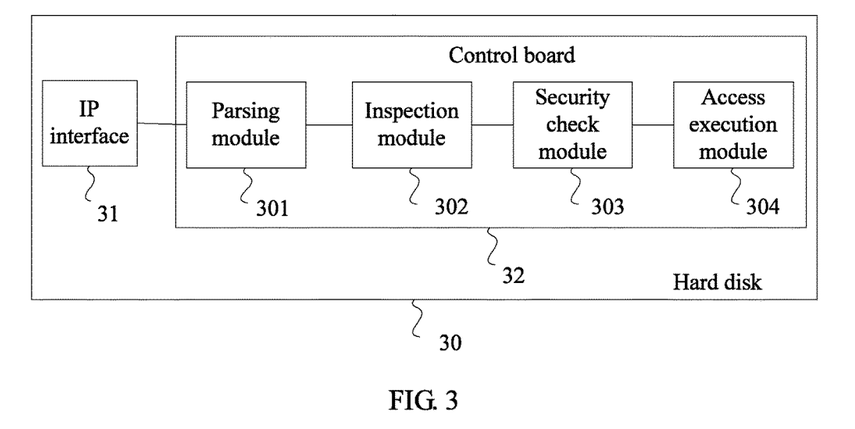
FIG. 3 is a schematic structural diagram of Embodiment 1 of a hard disk according to the present disclosure.

FIG. 3 is a schematic structural diagram of Embodiment 1 of a hard disk according to the present disclosure. As shown in FIG. 3, a hard disk 30 of this embodiment includes an IP interface 31 and a control board 32. The IP interface 31 is configured to receive an access data packet of a user, and send the access data packet to the control board 32.

The control board 32 includes a parsing module 301, an inspection module 302, a security check module 303, and an access execution module 304. The parsing module 301 is configured to parse the access data packet to obtain an authentication data packet, where the authentication data packet includes access permission information of the user. The inspection module 302 is configured to inspect the access permission information of the user according to a stored security policy to determine whether an access of the user is authorized, where the security policy records a correspondence between access permission information of users and sector identifiers of sectors on the hard disk 30. The security check module 303 is configured to perform a security check on the access data packet using a security algorithm if the access of the user is authorized. The access execution module 304 is configured to allow, according to the sector identifier, the user to access data in a corresponding sector on the hard disk 30 if the security check is passed.

The hard disk 30 in this embodiment may be configured to execute the technical solution of the method embodiment shown in FIG. 1. An implementation principle and a technical effect thereof are similar, and details are not repeatedly described herein.

Figure 4:
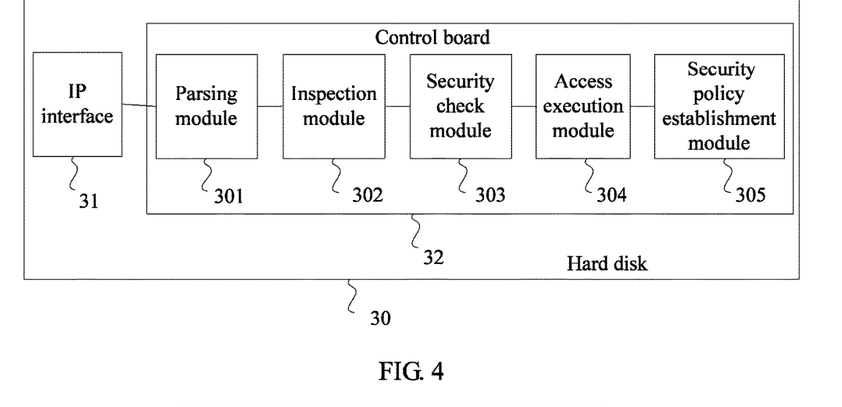
FIG. 4 is a schematic structural diagram of Embodiment 2 of a hard disk according to the present disclosure.

FIG. 4 is a schematic structural diagram of Embodiment 2 of a hard disk according to the present disclosure. As shown in FIG. 4, the hard disk 30 in this embodiment is on the basis of the structure of the hard disk 30 shown in FIG. 3. Further, the inspection module 302 is further configured to perform matching between the access permission information of the user and the access permission information of the users in the correspondence, and an access of the user is authorized if the matching is successful, or the access of the user is unauthorized if the matching is unsuccessful.

Optionally, the control board 32 further includes a security policy establishment module 305 configured to pre-establish a computing policy corresponding to the user in the control board 32, where the computing policy is a policy of using a security algorithm when a security check is performed on an access data packet of the user.

Optionally, the security check module 303 is further configured to perform a security check on the access data packet by selecting a different security algorithm or a combination of different security algorithms according to the computing policy for each access of the user.

The hard disk 30 in this embodiment may be configured to execute a technical solution of the technical solution of the method embodiment shown in FIG. 1. An implementation principle and a technical effect thereof are similar, and details are not repeatedly described herein.

Figure 5:
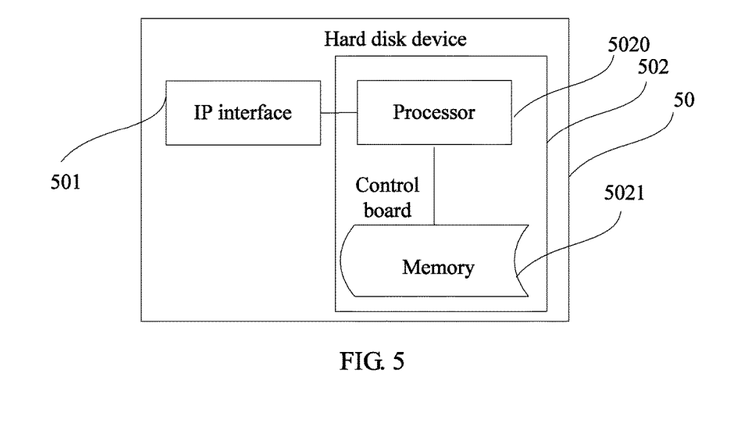
FIG. 5 is a schematic structural diagram of an embodiment of a hard disk device according to the present disclosure.

FIG. 5 is a schematic structural diagram of an embodiment of a hard disk device according to the present disclosure. As shown in FIG. 5, a hard disk device 50 provided in this embodiment includes an IP interface 501 and a control board 502, where the control board 502 includes a processor 5020 and a memory 5021. The IP interface 501 is configured to receive an access data packet of a user, and send the access data packet to the control board 502. The memory 5021 stores data and an executable instruction. When the hard disk device 50 runs, the processor 5020 communicates with the memory 5021, and the processor 5020 calls the executable instruction in the memory 5021 to execute the operations of parsing the access data packet to obtain an authentication data packet, where the authentication data packet includes access permission information of the user, inspecting the access permission information of the user according to a stored security policy to determine whether an access of the user is authorized, where the security policy records a correspondence between access permission information of users and sector identifiers of sectors on the hard disk 50, performing a security check on the access data packet using a security algorithm if the access of the user is authorized, and allowing, according to the sector identifier, the user to access data in a corresponding sector on the hard disk 50 if the security check is passed.

Optionally, the processor 5020 is further configured to perform matching between the access permission information of the user and the access permission information of the users in the correspondence, and the access of the user is authorized if the matching is successful, or the access of the user is unauthorized if the matching is unsuccessful.

Optionally, the processor 5020 is further configured to pre-establish a computing policy corresponding to the user in the control board 502, where the computing policy is a policy of using a security algorithm when a security check is performed on an access data packet of the user.

Optionally, the processor 5020 is further configured to perform a security check on the access data packet by selecting a different security algorithm or a combination of different security algorithms according to the computing policy for each access of the user.

Optionally, the processor 5020 is further configured to, when multiple hard disks provide data for a same user, the hard disks perform security checks on the access data packet of the user using a same security algorithm, or the hard disks perform security checks on the access data packet of the user using different security algorithms.

The hard disk device in this embodiment is configured to execute the technical solution described in any method embodiment. An implementation principle and a technical effect thereof are similar, and details are not repeatedly described herein.

In the several embodiments provided in the present application, it should be understood that the disclosed device and method may be implemented in other manners. For example, the described device embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented using some interfaces. The indirect couplings or communication connections between the devices or modules may be implemented in electronic, mechanical, or other forms.

The modules described as separate parts may or may not be physically separate. Parts displayed as modules may or may not be physical modules, and may be located in one position or may be distributed on a plurality of network units. Some or all of the modules may be selected according to actual requirements to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method of security access control for a hard disk, the hard disk comprising an Internet Protocol (IP) interface and a control board, and the method comprising:
receiving, by the IP interface, an access data packet of a user;
sending, by the IP interface, the access data packet to the control board;
parsing, by the control board, the access data packet to obtain an authentication data packet, the authentication data packet comprising access permission information of the user;
inspecting the access permission information of the user according to a security policy to determine whether an access of the user is authorized, the security policy being configured to record a correspondence between access permission information of a plurality of users and sector identifiers of sectors on the hard disk;
performing a security check on the access data packet using a security algorithm when the access of the user is authorized; and
allowing, according to a sector identifier, the user to access data in a corresponding sector on the hard disk when the security check is passed.

2. The method of claim 1, wherein inspecting the access permission information of the user according to the security policy to determine whether the access of the user is authorized comprises performing matching between the access permission information of the user and the access permission information of the users in the correspondence, the access of the user being authorized when the matching is successful, and the access of the user being unauthorized when the matching is unsuccessful.

3. The method of claim 1, further comprising pre-establishing a computing policy corresponding to the user in the control board, the computing policy is a policy of using the security algorithm when the security check is performed on the access data packet of the user.

4. The method of claim 3, wherein performing the security check on the access data packet using the security algorithm comprises performing the security check on the access data packet by selecting a different security algorithm according to the computing policy for each access of the user.

5. The method of claim 3, wherein performing the security check on the access data packet using the security algorithm comprises performing the security check on the access data packet by selecting a combination of different security algorithms according to the computing policy for each access of the user.

6. The method of claim 1, wherein multiple hard disks are configured to perform security checks on the access data packet of a selected one of the users using a same security algorithm when the multiple hard disks provide data for the selected one of the users.

7. A hard disk, comprising:
a control board comprising:
a memory comprising instructions; and
a processor coupled to the memory;
an Internet Protocol (IP) interface coupled to the control board and configured to:
receive an access data packet of a user, and
send the access data packet to the control board, and
wherein the processor is configured to:
parse the access data packet to obtain an authentication data packet, the authentication data packet comprising access permission information of the user;
inspect the access permission information of the user according to a security policy to determine whether an access of the user is authorized, the security policy being configured to record a correspondence between access permission information of a plurality of users and sector identifiers of sectors on the hard disk;
perform a security check on the access data packet using a security algorithm when the access of the user is authorized; and
allow, according to a sector identifier, the user to access data in a corresponding sector on the hard disk when the security check is passed.

8. The hard disk of claim 7, wherein the processor is further configured to perform matching between the access permission information of the user and the access permission information of the users in the correspondence, the access of the user being authorized when the matching is successful, and the access of the user being unauthorized when the matching is unsuccessful.

9. The hard disk of claim 7, wherein the processor is further configured to pre-establish a computing policy corresponding to the user in the control board, the computing policy being a policy of using the security algorithm when the security check is performed on the access data packet of the user.

10. The hard disk of claim 9, wherein the processor is further configured to perform the security check on the access data packet by selecting a different security algorithm according to the computing policy for each access of the user.

11. The hard disk of claim 9, wherein the processor is further configured to perform the security check on the access data packet by selecting a combination of different security algorithms according to the computing policy for each access of the user.

12. The method of claim 2, further comprising pre-establishing a computing policy corresponding to the user in the control board, the computing policy being a policy of using the security algorithm when the security check is performed on the access data packet of the user.

13. The method of claim 12, wherein performing the security check on the access data packet using the security algorithm comprises performing the security check on the access data packet by selecting a different security algorithm according to the computing policy for each access of the user.

14. The method of claim 12, wherein performing the security check on the access data packet using the security algorithm comprises performing the security check on the access data packet by selecting a combination of different security algorithms according to the computing policy for each access of the user.

15. The method of claim 12, wherein multiple hard disks are configured to perform security checks on the access data packet of a selected one of the users using a same security algorithm when the multiple hard disks provide data for the selected one of the users.

16. The method of claim 12, wherein multiple hard disks are configured to perform security checks on the access data packet of a selected one of the users using different security algorithms when the multiple hard disks provide data for the selected one of the users.

17. The method of claim 1, wherein multiple hard disks are configured to perform security checks on the access data packet of a selected one of the users using different security algorithms when the multiple hard disks provide data for the selected one of the users.

* * * * *